United States Patent
Kamath

(10) Patent No.: US 10,151,348 B2
(45) Date of Patent: Dec. 11, 2018

(54) BEARING RETAINER, BEARING AND ASSOCIATED METHOD

(71) Applicant: Regal Beloit America, Inc., Beloit, WI (US)

(72) Inventor: Anil Venkatray Kamath, Maharashtra (IN)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 15/202,604

(22) Filed: Jul. 6, 2016

(65) Prior Publication Data
US 2018/0010640 A1    Jan. 11, 2018

(51) Int. Cl.
 *F16C 33/66*    (2006.01)
 *F16C 19/10*    (2006.01)
 *F16C 33/38*    (2006.01)
 *F16C 19/16*    (2006.01)

(52) U.S. Cl.
 CPC .......... *F16C 33/6614* (2013.01); *F16C 19/16* (2013.01); *F16C 33/3862* (2013.01); *F16C 33/3875* (2013.01)

(58) Field of Classification Search
 CPC .............. F16C 33/3843; F16C 33/3862; F16C 33/4623; F16C 33/4641; F16C 33/6614; F16C 33/6651; F16C 33/3875
 See application file for complete search history.

(56) References Cited

U.S. PATENT DOCUMENTS

| | | | |
|---|---|---|---|
| 3,403,951 A * | 10/1968 | Bailey | F16C 33/3843 384/528 |
| 4,324,444 A | 4/1982 | Buczynski et al. | |
| 4,541,739 A | 9/1985 | Allen et al. | |
| 4,744,679 A | 5/1988 | Verburg et al. | |
| 5,230,570 A | 7/1993 | Bursey, Jr. et al. | |
| 6,402,386 B1 * | 6/2002 | Daikuhara | F16C 33/416 384/470 |
| 6,764,307 B2 | 7/2004 | Metrikin | |
| 8,360,653 B2 | 1/2013 | Shaikh | |
| 8,888,375 B2 | 11/2014 | Brock | |
| 9,057,405 B2 | 6/2015 | Hofmann et al. | |
| 9,512,880 B2 * | 12/2016 | Yasuda | F16C 33/3875 |
| 2015/0049977 A1 | 2/2015 | He | |
| 2015/0377289 A1 | 12/2015 | Scheidel et al. | |

* cited by examiner

Primary Examiner — James Pilkington
(74) Attorney, Agent, or Firm — John Wagley

(57) ABSTRACT

A bearing retainer for use in a bearing is provided. The bearing includes an inner ring, rolling elements and an outer ring. The bearing retainer has a body. The body defines an inner periphery and an outer periphery of the body. The body further defines a plurality of openings extending from the inner periphery to the outer periphery of the body. The plurality of openings are adapted to retain the rolling elements in a spaced apart relationship. The body further defines opposed faces extending from the inner periphery to the outer periphery of the body. The body further defines a plurality of face pockets formed in at least one of the faces of the body. The face pockets are adapted to storing lubrication. The body further includes a pathway from at least one face pocket of the body to the inner periphery of the body.

12 Claims, 7 Drawing Sheets

BEARING RETAINER, BEARING AND ASSOCIATED METHOD

BACKGROUND OF THE INVENTION

The embodiments described herein relate generally to bearings, and more specifically, to a retainer for a rolling element bearing.

Bearing assemblies are utilized to permit the relative motion of one component or assembly with respect to another component or assembly. The bearing assembly typically has a first component, for example an inner ring, that is fixed to a first component and a second component, for example, an outer ring that is fixed to a second component. The first component is permitted to have relative motion, typically to rotate, relative to the second component.

Many bearing assembly applications provide for the rotation of the inner element which is secured to a shaft while the outer element is secured to housing. Typically the inner element rotates, but many applications provide for the outer element rotating and the inner element stationary.

Often the bearing assembly is mounted in housing and the inner element which is secured to a shaft. The housing may be in the form of housing with a mounting arrangement for mounting to a surface with fasteners.

The rotation of the second component may be permitted by providing mating cylindrical surfaces between the components, where are typically known as sleeve bearings, as one of the two components is typically sleeved with a material that provides low friction rotation between the moving components.

Alternatively, a widely used configuration to permit rotation between the components is in the form of a set of rolling elements that are positioned between the cylindrical surface of one component and the cylindrical surface of the second component. The rolling element may be balls, needles, cylinders or cylinders with spherical outer peripheries, also known as spherical rollers. A single row of rolling elements may be used or two or more rows may be used in a spaced apart configuration. The rolling elements may be placed in adjoining relationship on the outer periphery of the inner element and on the inner periphery of the outer element. Alternatively the rolling elements may be positioned in a spaced apart relationship, separated from each other by a separator in the form of a retainer or cage. The rolling elements and the inner element, ring or race and the outer element, ring or race form a rolling element bearing.

Separators serve to separate adjacent rolling elements and to generally direct the rolling elements as they roll in the bearing races of the bearing inner ring and the bearing outer ring. Typically the separators are supported by the rolling elements and float between the inner ring and the outer ring of the bearing.

Lubricants are use to provide lubrication of the bearing race surfaces and the rolling element surfaces. The lubrication of these surfaces greatly reduces friction and extends the life of the bearing. The lubrication typically is from natural or synthetic oil. The oil may be suspended in grease. The grease may move away from the path of the rolling elements during bearing use. This grease and the lubricating oil that is suspending in the grease are available for replenishment as the oil is consumed by the bearing.

The grease that tends to move away from the path of the rolling elements during use tends to move out to the sides and outer periphery of the bearing during operation due to centrifugal forces. This grease may not readily return to lubricate the bearing races when needed. Further this grease on the peripheries of the bearing may be washed out of the bearing during extremely wet and dry ambient operating conditions. These factors leads to either premature bearing failure or increased maintenance costs included more frequent lubrication of the bearings.

Separators may be made by any suitable process and be made of any suitable material. Typically separators are made from two pieces stamped metal, formed to conform to the rolling elements and riveted together. Alternatively separators may be machined from a metal, for example brass, or be molded from a polymer or a composite.

Brass is very expensive compared to other separator materials such as stamped metal. Material costs have risen recently and further increases are possible. Further brass separators require expensive machining to meet the dimensional tolerances and finishes need for proper operation.

Stamped metal separators require expensive tooling and equipment, much of which may be dedicated to a particular separator size. Further, the riveting of the stamped metal separators may result in missing rivets, contamination or other manufacturing issues. The stamped metal separators may not provide adequate rolling element guidance which may result in noise or other quality issues.

The present invention is directed to alleviate at least some of these problems with the prior art.

BRIEF DESCRIPTION OF THE INVENTION

According to an embodiment of the invention, a bearing retainer for use in a bearing is provided. The bearing includes an inner ring, rolling elements and an outer ring. The bearing retainer has a body. The body defines an inner periphery and an outer periphery of the body. The body further defines a plurality of openings extending from the inner periphery to the outer periphery of the body. The plurality of openings are adapted to retain the rolling elements in a spaced apart relationship. The body further defines opposed faces extending from the inner periphery to the outer periphery of the body. The body further defines a plurality of face pockets formed in at least one of the faces of the body. The face pockets are adapted to storing lubrication. The body further includes a pathway from at least one face pocket of the body to the inner periphery of the body.

According to another aspect of the invention, the bearing retainer may be provided wherein the plurality of face pockets are formed in a first face of the body.

According to another aspect of the invention, the bearing retainer may further include a plurality of bore pockets formed in the inner periphery of the body.

According to another aspect of the invention, the bearing retainer may be provided wherein the body is configured to form a passageway from one of the face pockets to one of the bore pockets.

According to another aspect of the invention, the bearing retainer may further include a circumferential recess formed in the inner periphery of the body.

According to another aspect of the invention, the bearing retainer may be provided wherein the body is configured to form a passageway from the circumferential recess to at least one of the plurality of openings.

According to another aspect of the invention, the bearing retainer may be provided wherein the body is configured to form a passageway from one of the face pockets to the circumferential recess.

According to another aspect of the invention, the bearing retainer may further include a circumferential recess formed in the inner periphery of the body.

According to another aspect of the invention, the bearing retainer may be provided wherein the body is configured to form a passageway from one of the face pockets to one of the bore pockets and a passageway from one of the bore pockets to the circumferential recess.

According to another aspect of the invention, the bearing retainer may be provided wherein at least one of the openings is adapted to retain the rolling elements has a generally cylindrical shape and extends radially outwardly from the center of said body.

According to an embodiment of the invention, a bearing is provided. The bearing includes an inner ring defining an inner race, an outer ring defining an outer race, a plurality of rolling elements adapted to move along the inner race and the outer race, and a bearing retainer having a body. The body defines an inner periphery and an outer periphery of the body. The body further defines a plurality of openings extending from the inner periphery to the outer periphery. The plurality of openings are adapted to retain the rolling elements in a spaced apart relationship. The body further defines opposed faces extending from the inner periphery to the outer periphery of the body. The body further defines a plurality of face pockets formed in at least one of the faces of the body. The face pockets being adapted for storing lubrication. The body further includes a pathway from at least one face pocket to the inner periphery of the body.

According to another aspect of the invention, the bearing may further include a plurality of bore pockets formed in the inner periphery of said body. The bearing may also be provided wherein the body is configured to form a passageway from one of the face pockets to one of the bore pockets in the inner periphery of the body.

According to another aspect of the invention, the bearing may be provided wherein the bearing retainer further includes a circumferential recess formed in the inner periphery of the body and wherein the body is configured to form a passageway from the circumferential recess to at least one of the plurality of openings.

According to another aspect of the invention, the bearing may be provided wherein one of the face pockets is positioned between adjacent openings.

According to another aspect of the invention, the bearing may be provided wherein one of the bore pockets is positioned in axial alignment with one of the face pockets.

According to another aspect of the invention, the bearing may be provided wherein the plurality of face pockets are formed in a first face of the body.

According to another aspect of the invention, the bearing may further include a plurality of bore pockets formed in the inner periphery of the body.

According to another aspect of the invention, the bearing may be provided wherein the body includes a first portion and a second portion connectable to the first portion. The first portion and the second portion are substantially identical.

According to another aspect of the invention, the bearing may be provided wherein the first portion includes a first connector and wherein the second portion includes a second connector. The first connector and the second connector are adapted to cooperate with each other to secure the first portion to the second portion.

According to another aspect of the invention, the bearing may be provided wherein the first portion includes a plurality of first type connectors and a plurality of second type connectors and wherein the second portion includes a plurality of first type connectors and a plurality of second type connectors. At least some of the second type connectors are adapted to cooperate with at least some of the first type connectors to secure the first portion to the second portion.

According to another aspect of the invention, the bearing may be provided wherein the inner periphery defines a portion of the body adapted to closely conform with the inner ring.

According to another embodiment of the invention, a method for guiding and lubricating rolling elements in a bearing is provided. The method includes the steps of providing a bearing including an inner ring, an outer ring and a plurality of rolling elements and providing a bearing retainer having a body defining an inner periphery and an outer periphery of the body. The body further includes a plurality of openings extending from the inner periphery to the outer periphery. The method further includes the steps of adapting the plurality of openings to retain the rolling elements in a spaced apart relationship between the inner ring and the outer ring and forming a plurality of face pockets formed in at least one of the faces of the body. The method further includes the steps of adapting the face pockets for storing lubrication, providing an inner periphery pathway from one of the face pockets to the inner periphery; and providing an opening pathway from the inner periphery to one of the openings, whereby the inner periphery pathway and the opening pathway provide for lubrication of the rolling elements by the lubrication passing from the face pockets to the openings.

DETAILED DESCRIPTION OF THE INVENTION

The method, systems and apparatus described herein facilitate the guiding of rolling elements in a bearing and the lubrication of the rolling elements in a bearing. Separators serve to separate adjacent rolling elements and to generally direct the rolling elements as they roll in the bearing races of the bearing inner ring and the bearing outer ring. Typically the separators are supported by the rolling elements and float between the inner ring and the outer ring of the bearing. Lubricants are use to provide lubrication of the bearing race surfaces and the rolling element surfaces. The lubrication of these surfaces greatly reduces friction and extends the life of the bearing. The lubrication typically is from natural or synthetic oil. The oil may be suspended in grease. The grease may move away from the path of the rolling elements during bearing use. The separator may trap a portion of the grease moving away from the path of the rolling elements. Improvement in the guiding of the rolling elements and in their lubrication may improve the life of the bearing.

The methods, systems, and apparatus described herein assist in improved guidance of the rolling element and in improved lubrication of the bearing contact surfaces. The methods, systems, and apparatus described herein may also facilitate assembly speed and accuracy. Furthermore, the methods, systems, and apparatus described herein provide for an improved appearance of the bearing and its appeal to the customer Technical effects of the methods, systems, and apparatus described herein include at least one of improved performance and quality and reduced labor costs.

Figure 1:
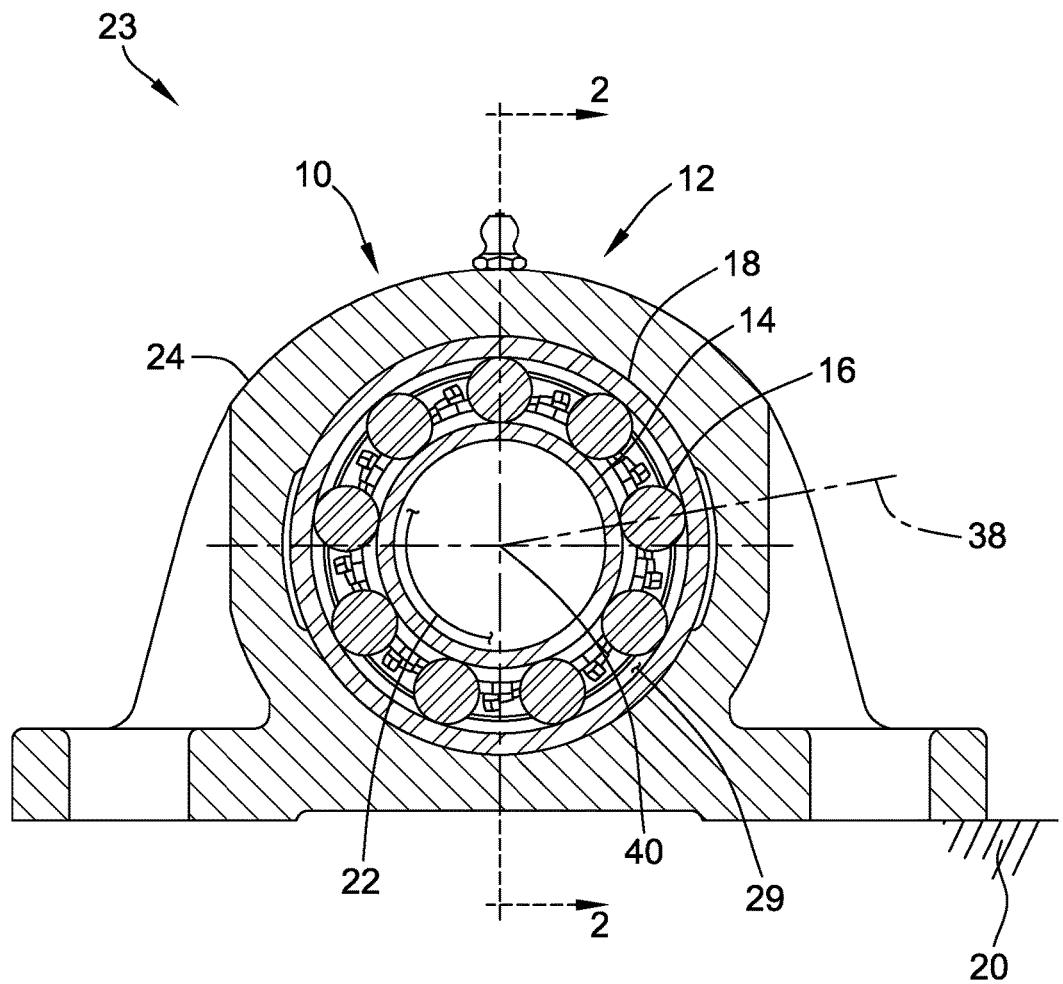
FIG. 1 is a plan view, partially in cross-section of an embodiment of the present invention in the form of an bearing assembly.
Figure 2:
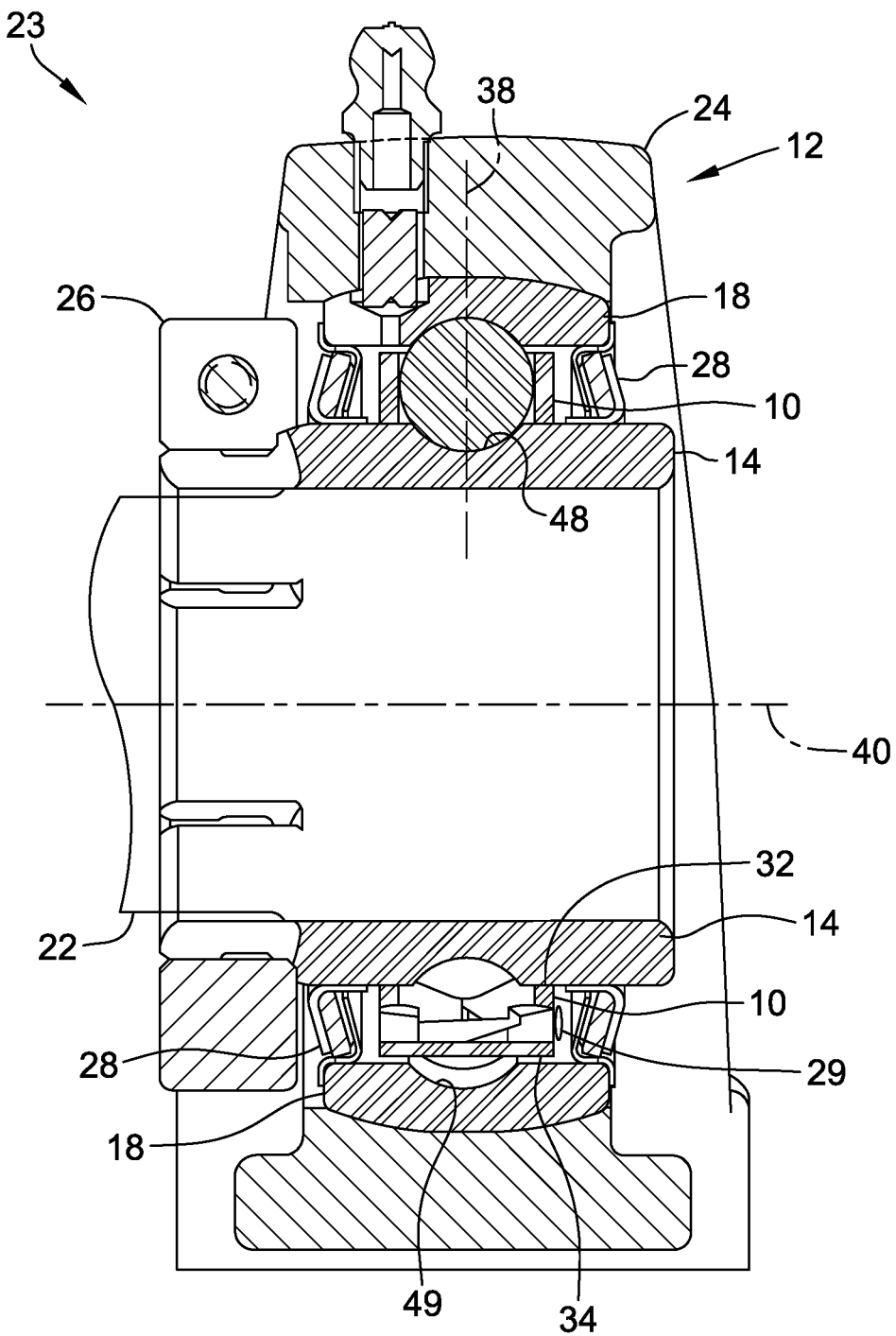
FIG. 2 is a cross sectional view of FIG. 1 along the line 2-2 in the direction of the arrows.

According to an embodiment of the invention and referring to FIGS. 1 and 2, a bearing retainer 10 for use in a bearing 12 is provided. The bearing 12 includes an inner ring 14, rolling elements 16 and an outer ring 18.

While, as shown, the bearing 12 is a ball bearing that utilizes rolling elements 16 in the form of spherical elements or balls, it should be appreciated that the rolling elements may be any rolling element including balls, cylindrical rollers, truncated balls, spherical rollers, and needle rollers.

The rolling elements 16, the inner ring 14 and the outer ring 18 may be made of any suitable durable material and may, for example, be made of a metal, for example, a steel alloy. If made of a metal, the metal may be heat treated, either through hardened or case hardened.

The bearing 12 may be used in a device 20 to, for example, support a rotating shaft 22. The bearing may be a portion of a bearing assembly 23. The bearing assembly 23 may include the bearing 12 and a housing 24 in which the bearing 12 may be mounted. The housing 24 may be surface mounted, as shown, and may, as shown, be a device commonly called a pillow block. The housing may alternatively be a face mounted bearing housing or be an integral housing for the device 20. The bearing assembly 23 may also include a feature 26 that may be used to lock or prevent relative motion of shaft 22 with respect to the bearing inner ring 14. The feature 26 may, as shown, be in the form of collar 26. The collar 26 may be provided to collapse around the shaft 22 as shown. Alternatively or in addition the collar may include a set screw (not shown) or eccentric ring (not shown) to provide the locking of the shaft to the inner ring.

Further, the bearing assembly 23 may also include seals 28 that may be positioned between the inner ring 14 and the outer ring 18 to prevent contamination to egress into the rolling elements 16 and to contain lubrication 29 within the bearing 12.

Figure 3:
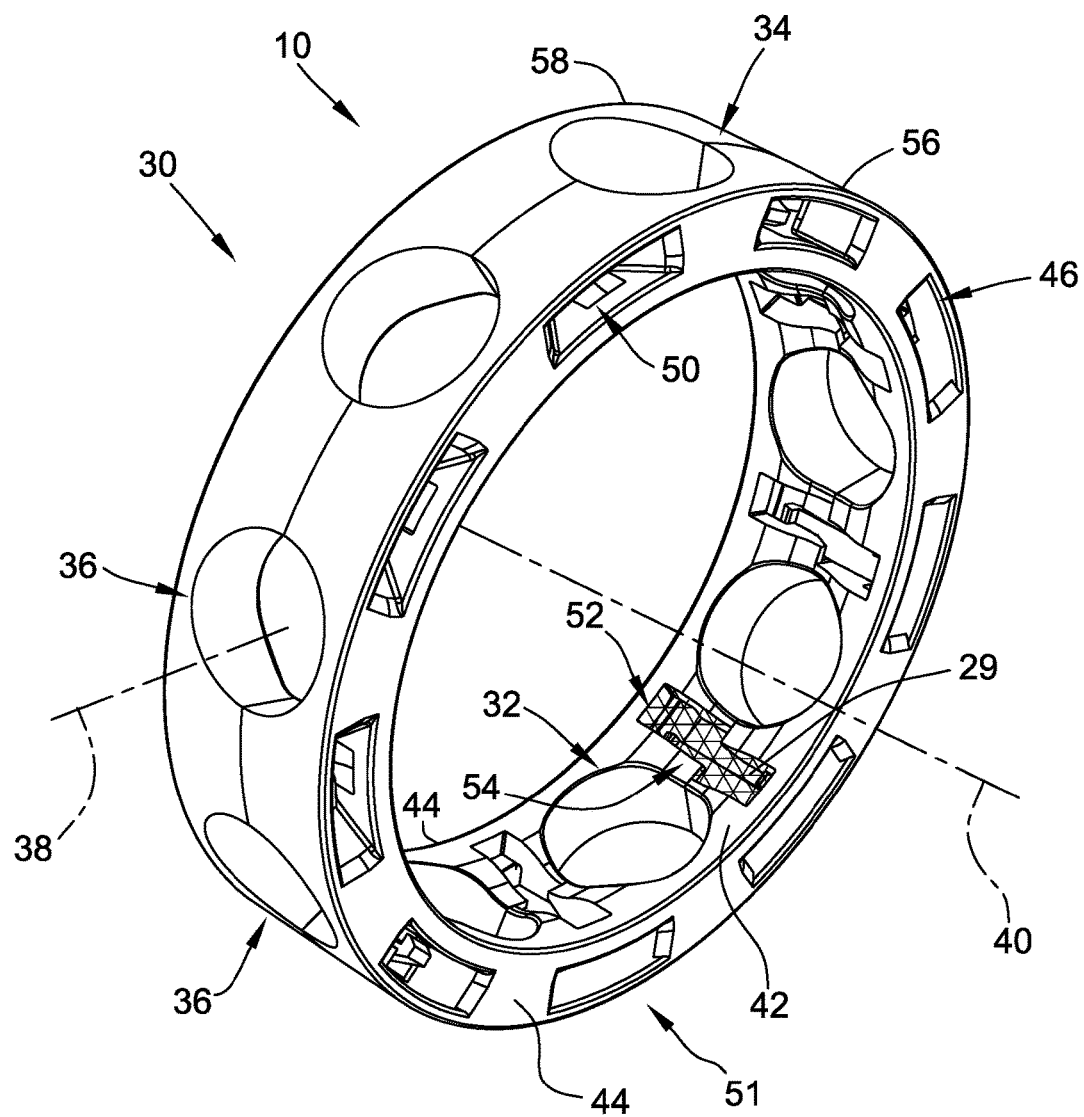
FIG. 3 is a perspective view of the bearing retainer of the bearing assembly of FIG. 1.
Figure 4:
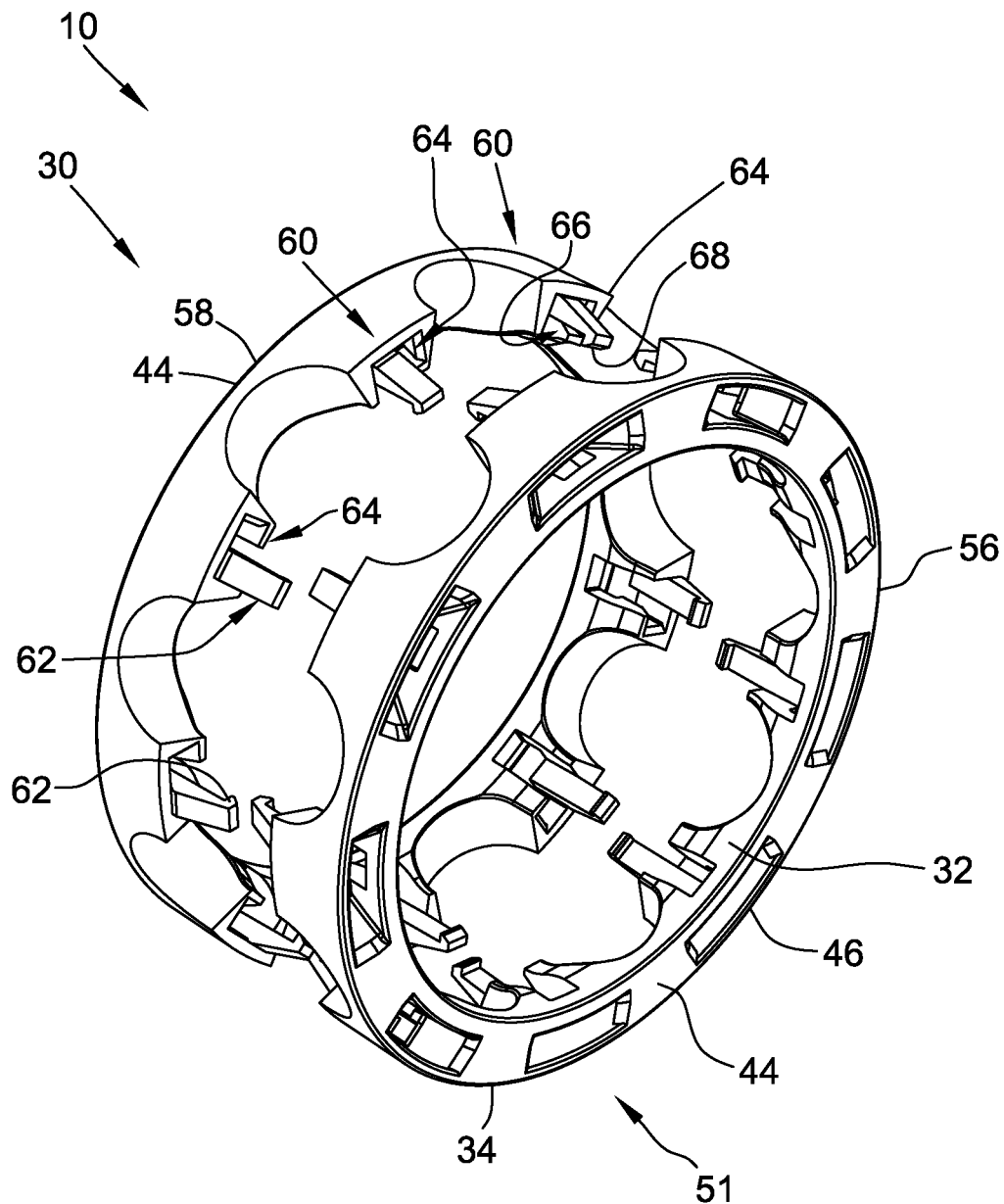
FIG. 4 is an exploded perspective view of the bearing retainer of FIG. 3.

Referring now to FIGS. 3 and 4, the bearing retainer 10 is shown in greater detail. The bearing retainer 10 includes a body 30.

The body 30 of the retainer 10 defines an inner periphery 32 and an outer periphery 34 of the body 30. The body 30 further defines a plurality of openings 36 extending from the inner periphery 32 to the outer periphery 34 of the body 30. The plurality of openings 36 are adapted to retain the rolling elements 16 in a spaced apart relationship.

The openings 36 may have any suitable shape. Preferably the openings 36 has a shape that conforms to the shape of the rolling elements 16 at their contact points/areas with the rolling elements 16. If the rolling elements 16 are balls or spheres, as shown in FIGS. 1-4, the openings 36 may be cylindrical or spherical shaped. A cylindrical shape provides for minimal contact with the elements 16 and minimal wear to the retainer. It should be appreciated that the cylindrical shape may be such that the openings define a cylindrical shape with an opening centerline 38 and a radius R extending from the opening centerline 38. The opening centerline 38 may extend, as shown, radially outwardly from bearing centerline 40.

As shown in FIGS. 1 and 2, the inner periphery 32 of the retainer 10 defines a portion 42 of the periphery 32 that is adapted to closely conform with the inner ring 14 of the bearing 12.

Referring now to FIGS. 3 and 4, the body 30 further defines opposed faces 44 extending from the inner periphery 32 to the outer periphery 34 of the body 30. The faces 44 may be planar, as shown, or have any other contour.

The body 30 may define areas or pockets for storing lubrication 29. For example and as shown in FIG. 3, the body 30 may further define a plurality of face pockets 46 formed in one of at least one of the faces 44 of the body 30. The pockets are adapted for storing lubrication 29. Typically the lubrication 29 is in the form of a grease.

The lubrication 29 is utilized to provide lubrication to the rolling elements 16 and to bearing race 48 of the inner ring 14 and to bearing race 49 of the outer ring 18 (see FIGS. 1 and 2).

Preferably and as shown in FIGS. 3 and 4, the body 30 defines lubricant pathways 51 for passage of the lubrication 29 from the pockets 46 to the rolling elements 16 and the races 48 and 49. The lubricant pathways 51 may be direct or, as shown, indirect. The lubricant pathways 51 may including face pocket pathways 50 extending from the face 44 to pocket 52. The lubricant pathways 51 may, as shown, include internal pathways 50 or passageways formed in the body 30 and peripheral pathways such as inner periphery pathways 54 for passage of the lubrication 29 from the pockets 52 to the rolling elements 16 and the races 48 and 49. It should be appreciated that the lubricant pathways 51 may be simplified by having the face pockets 46 intersect the inner periphery pathways 54.

The Pockets 46 may be configured to provide storage for lubrication 29 and pathways 50 for lubrication 29 such that all the rolling elements 16 may be individually lubricated. For simplicity and to optimally lubricate each rolling element 16, the body 30 may define one face pocket 46 for each rolling element 16. The pockets 46, as is shown, may be positioned between adjacent openings 36.

In addition to or instead of the face pockets 46, inner periphery pockets 52 may be formed in inner periphery 32 of the body 30. As shown in FIGS. 3 and 4 the body 30 may include both face pockets 46 and inner periphery pockets 52.

Preferably and as shown in FIGS. 3 and 4, the body 30 defines the inner periphery pathways 54 for passage of the lubrication 29 from the pockets 52 to the rolling elements 16 and the races 48 and 49. The pathways 54 may be indirect or, as shown, direct. The pathways 54 may be in the form of circumferential groove portions, each portion 54 positioned between the pocket 52 and one of the openings 36.

The pockets 52 may be configured to provide storage for lubrication 29 and pathways 54 for lubrication 29 such that all the rolling elements 16 may be individually lubricated. For simplicity and to optimally lubricate each rolling element 16, the body 30 may define two pockets 52 for each rolling element 16. The pockets 52, as are shown, may be positioned on opposed sides of each of the openings 36.

As shown in FIGS. 3 and 4 lubrication from the face pockets 46 may pass to the inner periphery pockets 52 by pathways 50 between the face pockets 46 and the inner periphery pockets 52.

The body 30 may be made of a unitary construction or may be made from a plurality components which are assembled together to form the body. As shown in FIGS. 3 and 4 and according to an aspect of the invention, the bearing retainer 10 may be provided wherein the body 30 includes a first portion or component 56 and a second portion or component 58 connectable to the first portion 56.

Using a plurality of components makes the molding of the complex features of the body 30 easier and less expensive. Further, the use of a plurality of components makes the assembly of the bearing easier and permits the insertion of the retainer 10 after the rolling elements 16 have been assembled to the rings 14 and 18.

While the first portion 56 and the second portion 58 may be different, for simplicity and to reduce manufacturing and tooling costs, the first portion 56 and the second portion 58 may, as shown in FIGS. 3 and 4, be substantially identical.

The first portion 56 and the second portion 58 may be connected to each other in any suitable manner. For example the first portion 56 and the second portion 58 may be connected by interference fit, by adhesives or, as shown, by connectors 60 that secure the portions 56 and 58 together.

As shown in FIGS. 3 and 4, the connectors 60 may be in the form of pairs of connectors 60. The pair of connectors 60 may include a first connector 62 in the first portion 56 which engages a second connector 64 in the second portion 58. For example and as shown in FIGS. 3 and 4, the first connector may be in the form of a protrusion 62 extending from one of the first portion 56 and the second connector may be in the form of an aperture or opening 64 defined by a ledge 66 in the body 30 extending from the second portion 58. The protrusion 62 may have a lip 68 that engages the ledge 66 to lock the portions 56 and 58 together.

The protrusion 62 is preferably resilient such that the protrusion is in an after assembly relaxed position in which the lip 68 engages the ledge 66 and a during assembly deflected position (not shown) in which the lip 68 is deflected so that it passes through the opening 64 before it is released into its relaxed position in engagement with the ledge 66.

For bearings 12 with an even number of rolling elements 16 and an even number of openings 36, a protrusion 62 and an opening 64 can be alternately positioned around a face 44 of the portions 56 and 58 so that an opening in the face 44 of first portion 56 engages a protrusion 62 in the face 44 of second portion 58 and vice versa.

For bearings with an odd number of rolling elements 16 and an odd number of openings 36, as shown in FIGS. 3 and 4, this alternating positioning for protrusions and openings cannot be utilize in identical portions to lock the portions 56 and 58 together. For bearings with an odd number of rolling elements 16, referring to FIGS. 3 and 4 and according to another aspect of the invention, the bearing retainer may be provided wherein the first portion 56 includes pairs including one first type connector 62 and one second type connector 64 and wherein the second portion 58 also includes pairs of one first type connector 62 and one second type connector 64. At least one pair of connectors 62 and 64 on the first portion 56 is adapted to cooperate with at least one pair of connectors 62 and 64 on the second portion 58 to secure the first portion 56 to the second portion 58.

As shown in FIG. 3 and FIG. 4, one pair of connectors 60 including one first type connector 62 and one second type connector 64 may be positioned between adjacent openings 36 along one face 44 of the first portion 56. Similarly, one pair of connectors 60 including one first type connector 62 and one second type connector 64 is positioned between adjacent openings 36 along one face 44 of the second portion 58. Note that utilizing this arrangement, the first portion 56 may be identical with the second portion 58 and that the respective pairs of first type connector 62 and second type connector 64 of the first portion and the second portion align with each other when the faces 44 of the portions 56 and 58 are brought together for assembly to each other.

Figure 5:
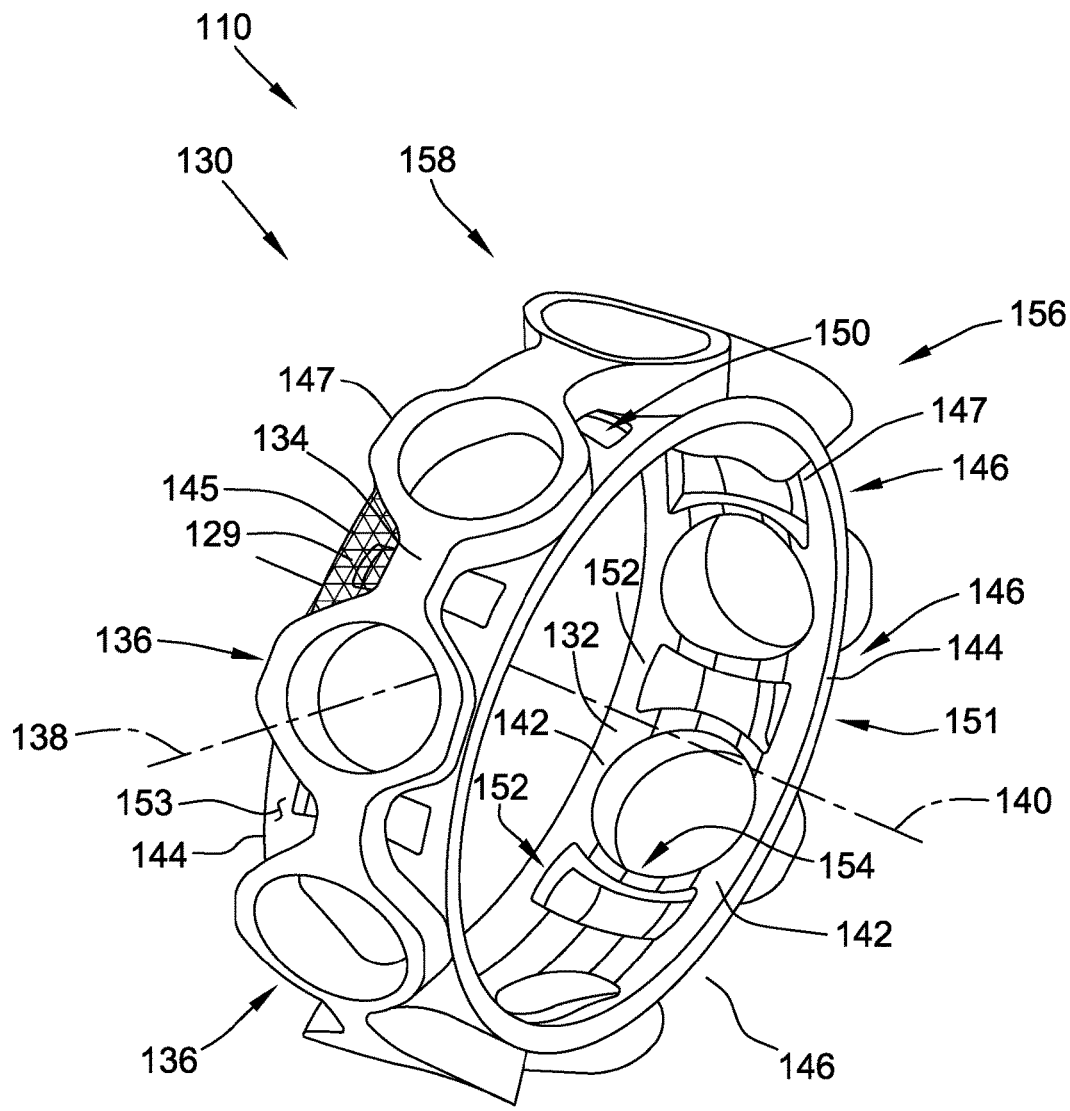
FIG. 5 is a perspective view of another embodiment of a bearing retainer according to the present invention.
Figure 6:
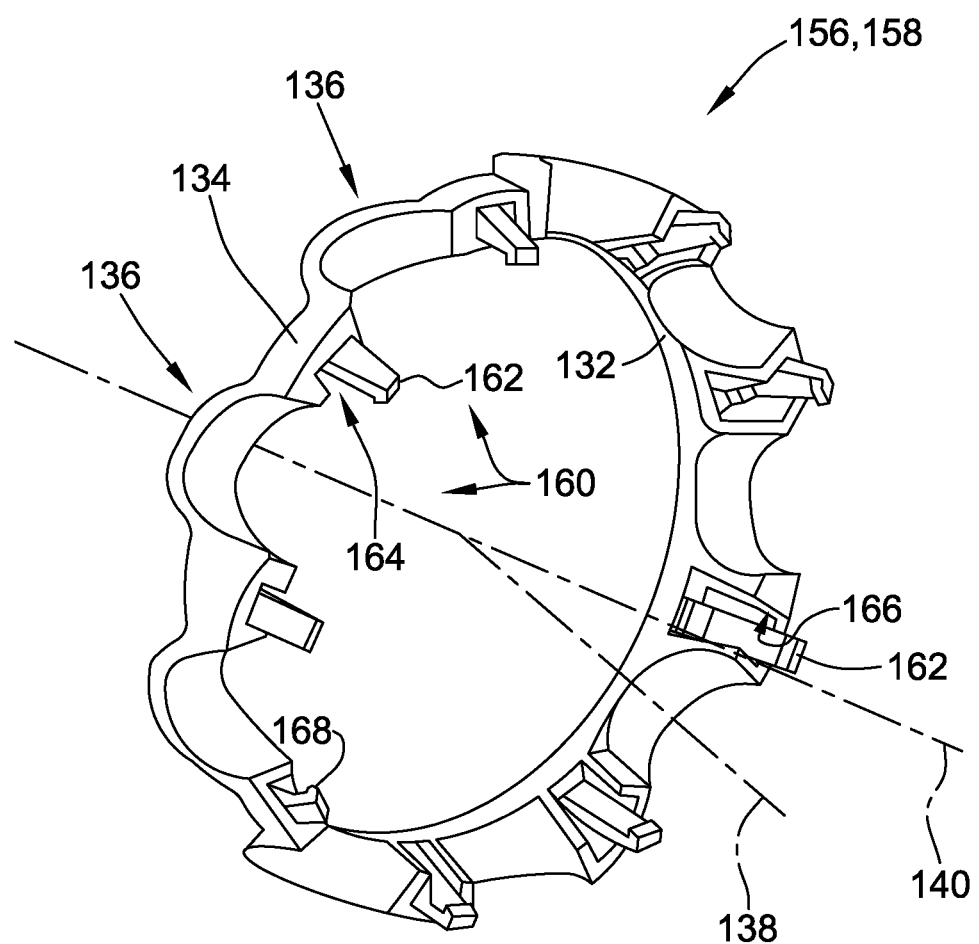
FIG. 6 is a perspective view of one retainer half of the bearing retainer of FIG. 5.

As shown in FIGS. 5 and 6, another embodiment of the present invention is shown as bearing retainer 110. The bearing retainer may be used in a bearing (not shown) similar or identical to bearing 12 of FIGS. 1-4 or any bearing described in the description of bearing 12 and may be assembled into a bearing assembly similar or identical to the bearing assembly 23 of FIGS. 1-2 or any assembly described in the description of bearing assembly 23

Referring now to FIGS. 5 and 6, the bearing retainer 110 includes a body 130.

The body 130 of the retainer 110 defines an inner periphery 132 and an outer periphery 134 of the body 130. The body 130 further defines a plurality of opening 136 extending from the inner periphery 132 to the outer periphery 134 of the body 130. The plurality of openings 136 are adapted to retain the rolling elements (not shown) in a spaced apart relationship.

The openings 136 may have any suitable shape. Preferably the openings 136 has a shape that conforms to the shape of the rolling elements (not shown) at their contact points/areas with the rolling elements. If the rolling elements are balls or spheres, as shown in FIGS. 5-6, the openings 136 may be cylindrical or spherical shaped. A cylindrical shape provides for minimal contact with the elements and minimal wear to the retainer 110. It should be appreciated that the cylindrical shape may be such that the openings define a cylindrical shape with an opening centerline 138 and a radius RR extending from the opening centerline 138. The opening centerline 138 may extend, as shown, radially outwardly from bearing centerline 140.

As shown in FIGS. 5 and 6, the inner periphery 132 of the retainer 110 defines a portion 142 of the periphery 132 that is adapted to closely conform with the inner ring of the bearing.

Referring now to FIG. 5, the body 130 further defines opposed faces 144, While the faces 144 extend from the inner periphery 132 to the outer periphery 134 of the body 130, only inner portion 145 of the faces 144 is planar. The outer portion 147 of the faces 144 is contoured and is in a spaced apart relationship to the opening 136.

The body 130 may define areas or pockets for storing lubrication 129. The pockets in the body 130 are less restrained and less defined than the pockets 46 and 52 of the body 30 of FIGS. 1-4.

For example and as shown in FIG. 5, the body 130 may further define a plurality of face-outer periphery pockets 146 formed in one of at least one of the faces 144 of the body 130 and extend inwardly from outer periphery 134 of the body 130. The pockets are adapted for storing lubrication 129. Typically the lubrication 129 is in the form of a grease.

Preferably and as shown in FIGS. 5 and 6, the body 130 defines lubricant pathways 151 for passage of the lubrication 129 from the pockets 146 to the openings 136. The lubricant pathways 151 may include internal pathways 150 in the form of, for example, axially extending bores, extending from outer peripheral surface 153 to inner periphery pockets 152. The lubricant pathways 151 may, as shown, include the internal pathways 150 or bores formed in the body 130 and peripheral pathways such as inner periphery pathways 154 for passage of the lubrication 29 from the pockets 152 to the rolling elements 16 and the races 48 and 49. It should be appreciated that the lubricant pathways 151 may be simplified by having the bores 150 intersect the inner periphery pathways 154. The lubricant pathways 151 may be direct or, as shown, indirect. The lubricant pathways 151 may, as shown, include internal pathways 150 or passageways formed in the body 130.

In addition to or instead of the face-outer periphery pockets 146, the inner periphery pockets 152 may be formed in inner periphery 132 of the body 130. As shown in FIGS. 5 and 6, the body 130 may include both face-outer periphery pockets 146 and inner periphery pockets 152.

Preferably and as shown in FIGS. 5 and 6, the body 130 defines the peripheral pathways 154 for passage of the lubrication 129 from the pockets 152 to the openings 136. The peripheral pathways 154 may be indirect or, as shown, direct. The peripheral pathways 154 may be in the form of circumferential groove portions, each portion 154 positioned between a pocket 152 and one of the openings 136.

As shown in FIGS. 5 and 6, lubrication from the face-outer periphery pockets 146 may pass to the inner periphery pockets 152 by internal pathways 150 between the face-outer periphery pockets 146 and the inner periphery pockets 152.

The body 130 may be made of a unitary construction or may be made from a plurality components which are assembled together to form the body. As shown in FIGS. 5 and 6 and according to an aspect of the invention, the bearing retainer 110 may be provided wherein the body 130 includes a first portion or component 156 and a second portion or component 158 connectable to the first portion 156.

The first portion 156 and the second portion 158 may be connected to each other in any suitable manner. For example the first portion 156 and the second portion 158 may be connected by interference fit, by adhesives or, as shown, by connectors 160 that secure the portions 156 and 158 together.

As shown in FIGS. 5 and 6, the connectors 160 may be in the form of pairs of connectors 160. The connectors 160 are similar to the connectors 60 of FIGS. 1-4. The pair of connectors 160 may include a first connector 162 in the first portion 156 which engages a second connector 164 in the second portion 158. For example and as shown in FIGS. 5 and 6, the first connector may be in the form of a protrusion 162 extending from one of the first portion 156 and the second portion 158. The second connector may be in the form of an aperture or opening 164 defined by a ledge 166 in the body 130 extending from the other of the first portion 156 and the second portion 158. The protrusion 162 may have a lip 168 that engages the ledge 166 to lock the portions 156 and 158 together.

Figure 7:
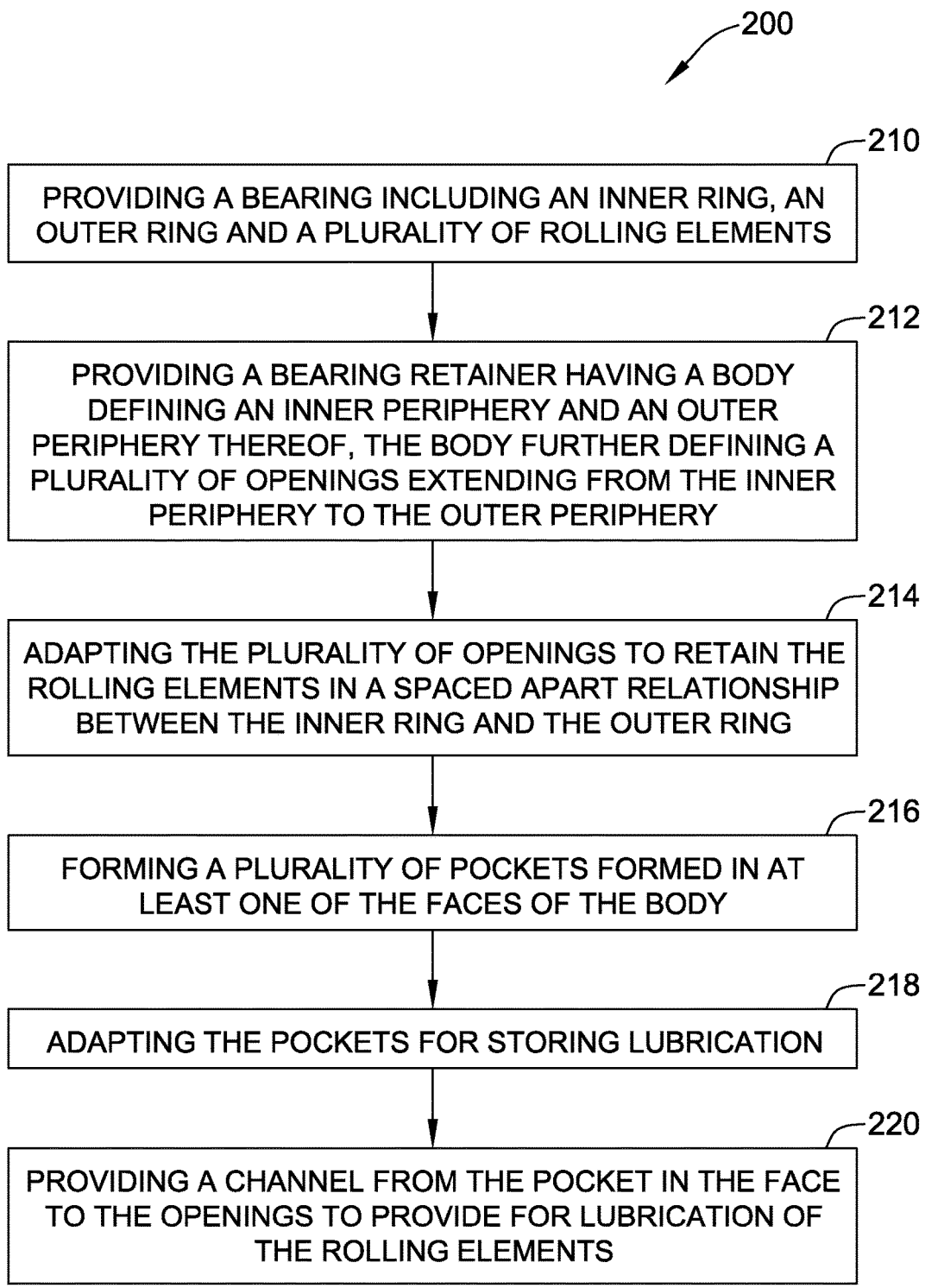
FIG. 7 is a schematic flow chart of a method for using the bearing retainer of the present invention.

According to another embodiment of the invention and referring to FIG. 7, a method 200 for guiding and lubricating rolling elements in a bearing is provided. The method includes the step 210 of providing a bearing including an inner ring, an outer ring and a plurality of rolling elements and step 212 of providing a bearing retainer having a body defining an inner periphery and an outer periphery. The body further defines a plurality of openings extending from the inner periphery to the outer periphery of the body.

The method 200 further includes step 214 of adapting the plurality of openings to retain the rolling elements in a spaced apart relationship between the inner ring and the outer ring, step 216 of forming a plurality of pockets formed in the body, step 218 of adapting the pockets for storing lubrication, and step 220 of providing a channel from the pockets of the body to the openings to provide for lubrication of the rolling elements.

The methods, systems, and apparatus described herein facilitate efficient and economical assembly of a bearing assembly. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing bearing retainers that reduce costs or provide additional space for grease. Furthermore, the exemplary methods system and apparatus achieve improved rolling element guidance and improved bearing life. The methods, system and apparatus described herein may be used in any suitable application.

Exemplary embodiments of the retainer, bearing, and bearing assembly are described above in detail. The bearing assembly and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

What is claimed is:

1. A bearing retainer for use in a bearing including an inner ring, rolling elements and an outer ring, the bearing retainer comprising a body, defining a generally cylindrical inner periphery and a generally cylindrical outer periphery thereof, said body further defining a plurality of openings extending from the inner periphery to the outer periphery, the plurality of openings adapted to retain the rolling elements in a spaced apart relationship, said body further defining opposed faces extending from the inner periphery to the outer periphery thereof, said body further defining a plurality of face pockets formed in at least one of the faces of the body, the face pockets being adapted for storing lubrication, said body further defining a circumferential groove positioned centrally in the inner periphery of said body and a plurality of inner periphery pockets spaced from the plurality of openings and formed in the inner periphery of said body, said body.

2. The bearing retainer in accordance with claim 1, wherein the circumferential groove formed in the inner periphery of said body provides a lubricant path from the inner periphery pockets to the plurality of openings.

3. The bearing retainer in accordance with claim 2, wherein the body forms a first pathway from one of the face pockets to one of the inner periphery pockets and wherein the circumferential groove forms a second pathway from one of the inner periphery pockets to one of the plurality of openings.

4. A bearing, comprising:
an inner ring defining an inner race;
an outer ring defining an outer race;
a plurality of rolling elements adapted to move along the inner race and the outer race; and
a bearing retainer having a body, said body formed by a first portion and a second portion connected to the first portion, said body defining an inner periphery and an outer periphery thereof, said body further defining a plurality of openings extending from the inner periphery to the outer periphery, the plurality of openings adapted to retain the rolling elements in a spaced apart relationship, at least one of the first portion and the second portion including a plurality of connectors for connecting the first portion to the second portion, said body further defining opposed faces extending from the inner periphery to the outer periphery thereof, said body further defining a plurality of face pockets formed in at least one of the faces of the body, the face pockets being adapted for storing lubrication, said body further comprising a pathway for lubricant from at least one face pocket to the inner periphery of said body, said plurality of face pockets extending radially inwardly of the plurality of connectors.

5. The bearing in accordance with claim 4:
wherein the bearing retainer further includes a circumferential groove formed in the inner periphery of said body; and
wherein the body forms the pathway for lubricant from the circumferential groove to at least one of the plurality of openings.

6. The bearing in accordance with claim 4, wherein one of the face pockets is positioned between adjacent openings of the plurality of openings.

7. The bearing in accordance with claim 4, wherein the plurality of face pockets are formed in a first face of said body.

8. The bearing in accordance with claim 4, further comprising a plurality of inner periphery pockets formed in the inner periphery of said body and spaced from the openings.

9. The bearing in accordance with claim 8, wherein one of the inner periphery pockets is positioned in axial alignment with one of the face pockets.

10. The bearing in accordance with claim 4, wherein said first portion and said second portion are substantially identical.

11. The bearing in accordance with claim 4:
wherein the first portion comprises a plurality of first type connectors and a plurality of second type connectors; and
wherein the second portion comprises a plurality of first type connectors and a plurality of second type connectors, at least some of the second type connector adapted to cooperate with at least some of the first type connectors to secure the first portion to the second portion.

12. A method for guiding and lubricating rolling elements in a bearing, said method comprises the steps of:
providing a bearing including an inner ring, an outer ring and a plurality of rolling elements;
providing a bearing retainer having a body having a first portion and a second portion and defining an inner periphery and an outer periphery thereof, the body further defining a plurality of openings extending from the inner periphery to the outer periphery, the body including a plurality of connectors for connecting the first portion to the second portion;
retaining the rolling elements with the plurality of openings in a spaced apart relationship between the inner ring and the outer ring;
forming a plurality of face pockets formed in at least one of the faces of the body, the plurality of face pockets extending radially inwardly from the plurality of connectors;
forming a plurality of inner periphery pockets in the inner periphery of the body of the bearing retainer;
storing lubrication in the face pockets;
providing a pathway for lubricant from one of the face pockets to one of the inner periphery pockets; and
providing a circumferential groove for advancing lubrication from one of the inner periphery pockets to one of the plurality of openings, whereby the pathway and the circumferential groove provide for lubrication of one of the rolling elements by the lubrication passing from one of the face pockets to one of the plurality of openings.

* * * * *